US011870195B2

(12) United States Patent
Wu

(10) Patent No.: US 11,870,195 B2
(45) Date of Patent: Jan. 9, 2024

(54) KEYSTONE JACK ASSEMBLY

(71) Applicant: HSING CHAU INDUSTRIAL CO., LTD., Taipei (TW)

(72) Inventor: Kei-Wei Wu, Taipei (TW)

(73) Assignee: HSING CHAU INDUSTRIAL CO., LTD., Taipei (TW)

( * ) Notice: Subject to any disclaimer, the term of this patent is extended or adjusted under 35 U.S.C. 154(b) by 160 days.

(21) Appl. No.: 17/535,723

(22) Filed: Nov. 26, 2021

(65) Prior Publication Data

US 2023/0170631 A1 Jun. 1, 2023

(51) Int. Cl.

| | |
|---|---|
| ***H01R 24/00*** | (2011.01) |
| ***H01R 4/2433*** | (2018.01) |
| ***H01R 13/453*** | (2006.01) |
| ***H01R 13/518*** | (2006.01) |
| ***H01R 24/64*** | (2011.01) |

(52) U.S. Cl.

CPC ....... *H01R 4/2433* (2013.01); *H01R 13/4532* (2013.01); *H01R 13/518* (2013.01); *H01R 24/64* (2013.01)

(58) Field of Classification Search

CPC .............. H01R 4/2433; H01R 13/4532; H01R 13/518; H01R 24/64

USPC .......................................................... 439/676

See application file for complete search history.

(56) References Cited

U.S. PATENT DOCUMENTS

| | | | | | |
|---|---|---|---|---|---|
| 4,501,459 | A * | 2/1985 | Chandler | H01R 13/65912 | 439/514 |
| 5,503,572 | A * | 4/1996 | White | H01R 13/506 | 439/76.1 |
| 5,885,111 | A * | 3/1999 | Yu | H01R 13/6467 | 439/676 |
| 5,947,752 | A * | 9/1999 | Wu | H01R 13/743 | 439/76.1 |
| 6,045,390 | A * | 4/2000 | Metz | H01R 24/64 | 439/98 |
| 6,786,775 | B1 * | 9/2004 | Hanrahan | H01R 24/64 | 439/676 |
| 7,404,739 | B2 * | 7/2008 | Sheilds | H01R 13/6272 | 439/607.05 |
| 7,413,464 | B1 * | 8/2008 | Chen | H01R 13/5829 | 439/417 |
| 7,713,081 | B2 * | 5/2010 | Chen | H01R 9/0527 | 439/468 |
| 8,267,714 | B2 * | 9/2012 | Siemon | H01R 13/6463 | 439/418 |

(Continued)

*Primary Examiner* — Abdullah A Riyami
*Assistant Examiner* — Vladimir Imas

(57) ABSTRACT

A keystone jack assembly includes a jack housing, a piercing contact housing disposed on the jack housing, a plurality of piercing contacts mounted on the piercing contact housing, a wire cap movably disposed on the piercing contact housing and a cover pivotally connected to the jack housing. The wire cap includes a cap main body, at least one first guiding portion, at least one second guiding portion and a third guiding portion. The cover includes two covering parts, and each covering part includes a main body, at least one first contact portion, at least one second contact portion and a third contact portion. The first contact portion abuts against the first guiding portion, the second contact portion abuts against the second guiding portion and the third contact portion abuts against the third guiding portion in order as the two covering parts pivots toward each other.

20 Claims, 15 Drawing Sheets

(56) References Cited

U.S. PATENT DOCUMENTS

| | | | | |
|---|---|---|---|---|
| 9,130,283 | B1 * | 9/2015 | Lin | H01R 4/2433 |
| 9,312,652 | B2 * | 4/2016 | Smith | H01R 24/64 |

* cited by examiner

KEYSTONE JACK ASSEMBLY

BACKGROUND OF THE INVENTION

1. Field of the Invention

The present disclosure relates to a keystone jack assembly, and in particular to an extremely short, slim and compact keystone jack assembly with a wire cap and a cover capable of avoiding unbalance installation by progressive contact.

2. Description of the Related Art

Wired and wireless communication are ordinary to people in daily lives. As communicating techniques evolve to the 5$^{th}$ generation, i.e., 5G, demands for Wi-Fi 6 projects that support faster communicating speed are more common than before, and more cabling connections are required to span from equipment to terminal devices. However, since some telecom buildings are built for years, it is important to double the cabling connections in limited space.

In the past, an EIA-1U 24 port was a gold standard for rack unit arrangements. Since the cabling connections need to be doubled, a short, slim and compact keystone jack is thus necessary to fit 48 pecks in the EIA-1U patch panel.

Besides the cabling connections requirement, thicker wires are also employed in the keystone jack to enhance the communication ability. In the past, when the keystone jack is installed onto corresponding patch panels by technicians, a plurality of wires originated from a cable were passing through a wire cap, and the technicians would use a tool-less cover to press the wire cap into/onto a piercing contact housing such as an insulation-displacement connector (IDC) housing to make the piercing contact housing or piercing contacts mounted on the piercing contact housing pierce outer insulations of the wires. The cores wrapped in the outer insulations were thus exposed and contacted with the piercing contacts, so the entire keystone jack is deployed. However, as shown in FIG. 1, when a wire cap 10 with wires 22 originated from a cable 20 is installed to a jack housing 30 of a keystone jack module 1000, a tip 42 of a first part 40 of a cover abuts against a side of the wire cap 10, but another tip 52 of a second part 50 of the cover does not contact the wire cap 10 correctly. This phenomenon may cause deflection or incorrect mounting of the wire cap 10 during pressing.

Moreover, as thicker wires are employed due to required enhanced communication ability mentioned above, outer diameters of the wires 22 becomes greater, which results in the wire cap 10 with a higher top surface, and it is more difficult for the tip 42 of the first part 40 and the tip 52 of the second part 50 to reach two top corners of the wire cap 10 in their pivot paths.

BRIEF SUMMARY OF THE INVENTION

An objective of the present disclosure is to provide a keystone jack assembly that maintain short, slim and compact size and avoid unbalanced installation.

To achieve at least the above objective, the present disclosure provides a keystone jack assembly including a jack housing, a piercing contact housing disposed on the jack housing, a plurality of piercing contacts mounted on the piercing contact housing, a wire cap movably disposed on the piercing contact housing to envelop the plurality of piercing contacts and a cover pivotally connected to the jack housing or the piercing contact housing. The wire cap includes a cap main body with a cable passage, at least one first guiding portion, at least one second guiding portion and a third guiding portion. The first guiding portion and the second guiding portion are connected to the cap main body. The third guiding portion is connected between the first guiding portion and the cable passage and between the second guiding portion and the cable passage. The cover includes two covering parts, and each covering part includes a main body, at least one first contact portion, at least one second contact portion and a third contact portion. The first contact portion and the second contact portion are connected to the corresponding main body. The third contact portion is connected to and disposed outside the first contact portion and the second contact portion relative to a center cooperatively defined by the two covering parts. The first contact portion abuts against the first guiding portion, the second contact portion abuts against the second guiding portion and the third contact portion abuts against the third guiding portion in order as the two covering parts pivots toward each other.

Preferably, the cap main body has a cap main body side surface. The first guiding portion protrudes away from the cap main body side surface and has a first guiding upper surface proximal to the cable passage. The second guiding portion has a second guiding upper surface proximal to the cable passage, and the second guiding upper surface is equal to or higher than the first guiding upper surface.

Preferably, the third guiding portion has a third guiding upper surface. The first guiding upper surface includes a first distal surface section and a first proximal surface section. The first proximal surface section is connected between the first distal surface section and the third guiding upper surface. The first distal surface section defines a first distal plane, and the first proximal surface section defines a first proximal plane. An angle formed between the first distal plane and the third guiding upper surface is greater than an angle formed between the first proximal plane and the third guiding upper surface.

Preferably, the first distal surface section and the first proximal surface section are planes, arc surfaces or combinations thereof.

Preferably, the second guiding upper surface is an arc surface, a spherical surface or a chamfering surface.

Preferably, the third guiding portion is planar and encloses the cable passage.

Preferably, the first guiding portion and the second guiding portion are both plural. The first guiding portions and the second guiding portions are respectively symmetrically disposed at a periphery of the cap main body about the cable passage at the same intervals.

Preferably, the first contact portion has a first contact lower surface, and the second contact portion has a second contact lower surface. The second contact lower surface is equal to or higher than the first contact lower surface.

Preferably, the third contact portion has a third contact lower surface. The second contact lower surface includes a second distal surface section and a second proximal surface section. The second proximal surface section is connected between the second distal surface section and the third contact lower surface. The second distal surface section defines a second distal plane, and the second proximal surface section defines a second proximal plane. An angle formed between the second distal plane and the third contact lower surface is greater than an angle formed between the second proximal plane and the third contact lower surface.

Preferably, the second distal surface section and the second proximal surface section are both planes.

Preferably, the third contact portion has a third contact lower surface, and the first contact lower surface is coplanar with the third contact lower surface.

Preferably, each covering part further includes a latching portion and a locking portion. A mortise is formed on the locking portion, and the two covering parts interlock with each other through engagement between each of the latching portion and the corresponding mortise.

Preferably, the locking portion has a locking lower surface and a locking side surface. The mortise is formed on the locking lower surface. An operating hole is formed on the locking side surface and communicates with the mortise.

Preferably, each covering part further includes a pivoting portion protrudes toward an inner side of the corresponding main body. The two pivoting portions are engaged with the jack housing or the piercing contact housing, and the two covering parts are pivotally disposed at two opposite sides of the wire cap.

Preferably, the first contact portion has a first contact side surface, and the second contact portion has a second contact side surface. The first contact side surface is coplanar with or protrudes relative to the second contact side surface.

Preferably, the two covering parts are point symmetric about the center.

Preferably, a cable is accommodated in the cable passage and includes a plurality of wires passing through the cap main body. The first guiding portion is located in a retracting path of an end of the first contact portion when the wires barely abut against top sides of the piercing contacts or the piercing contact housing.

Preferably, each covering part has a covering side surface, and the jack housing has a housing side surface. An angle formed between the covering side surface and the housing side surface is from 145 to 149 degrees while the first contact portion contacts with the first guiding portion.

Preferably, the angle is from 149 to 168 degrees while the second contact portion contacts with the second guiding portion, and the first contact portion is separated from the first guiding portion.

Preferably, the angle is from 168 to 180 degrees while the third contact portion contacts with the third guiding portion.

DETAILED DESCRIPTION OF THE INVENTION

To facilitate understanding of the object, characteristics and effects of this present disclosure, embodiments together with the attached drawings for the detailed description of the present disclosure are provided.

Figure 1:
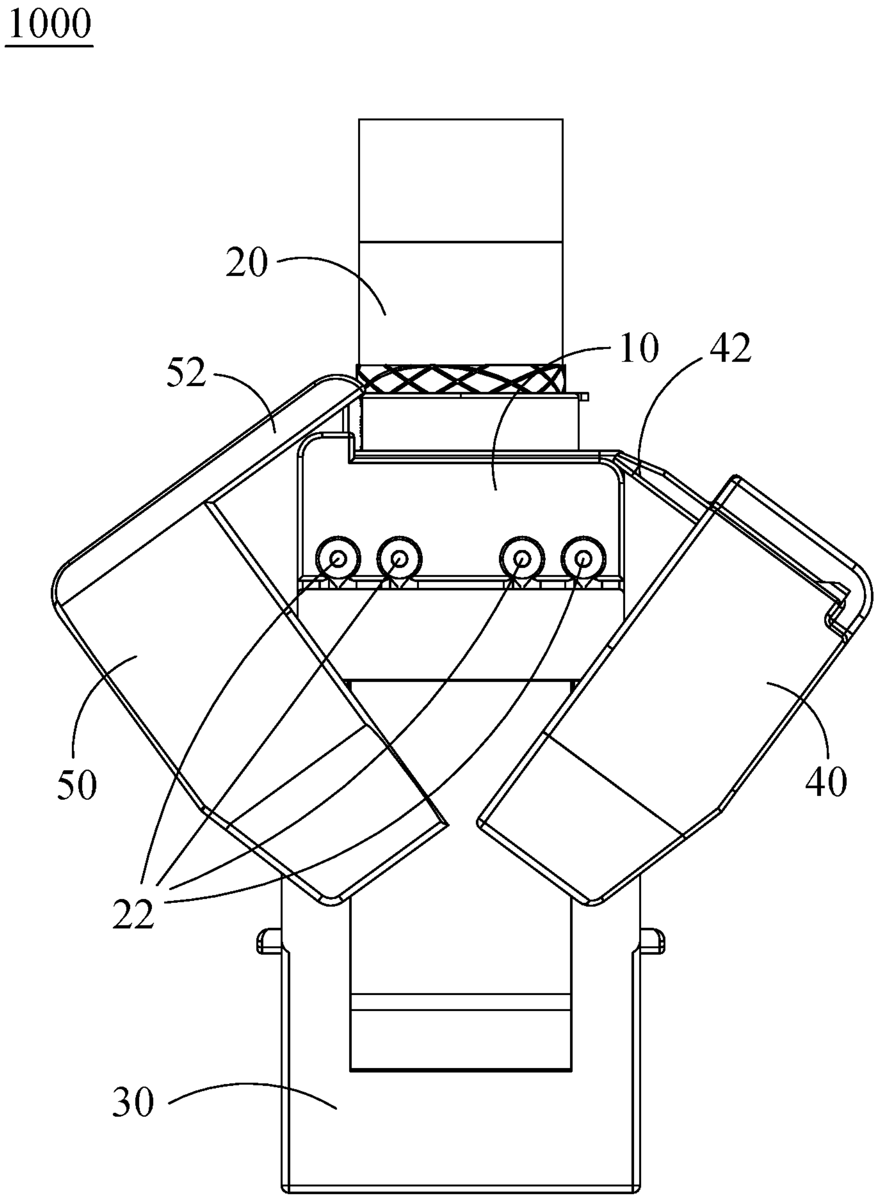
FIG. 1 ( prior art )
FIG. 1 is an illustrative diagram showing a conventional cover mounting a wire cap onto a keystone jack housing.
Figure 2:
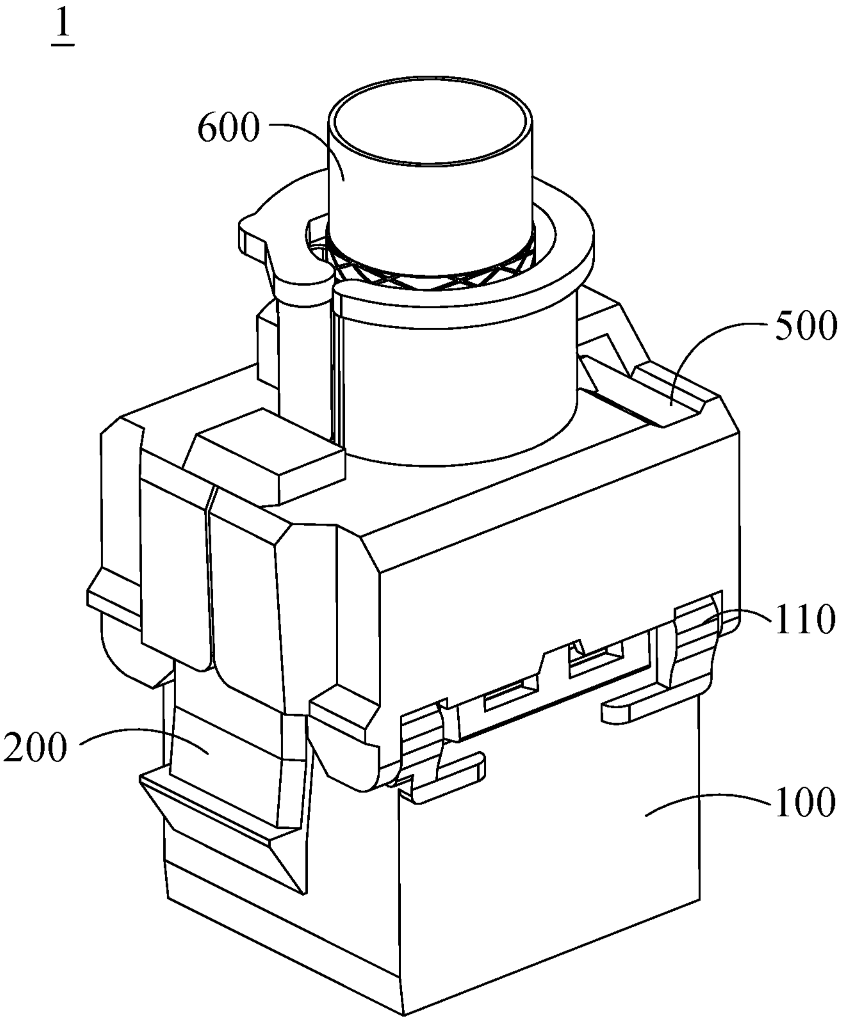
FIG. 2 is a perspective diagram illustrating a keystone jack assembly according to an embodiment of the present disclosure.
Figure 3:
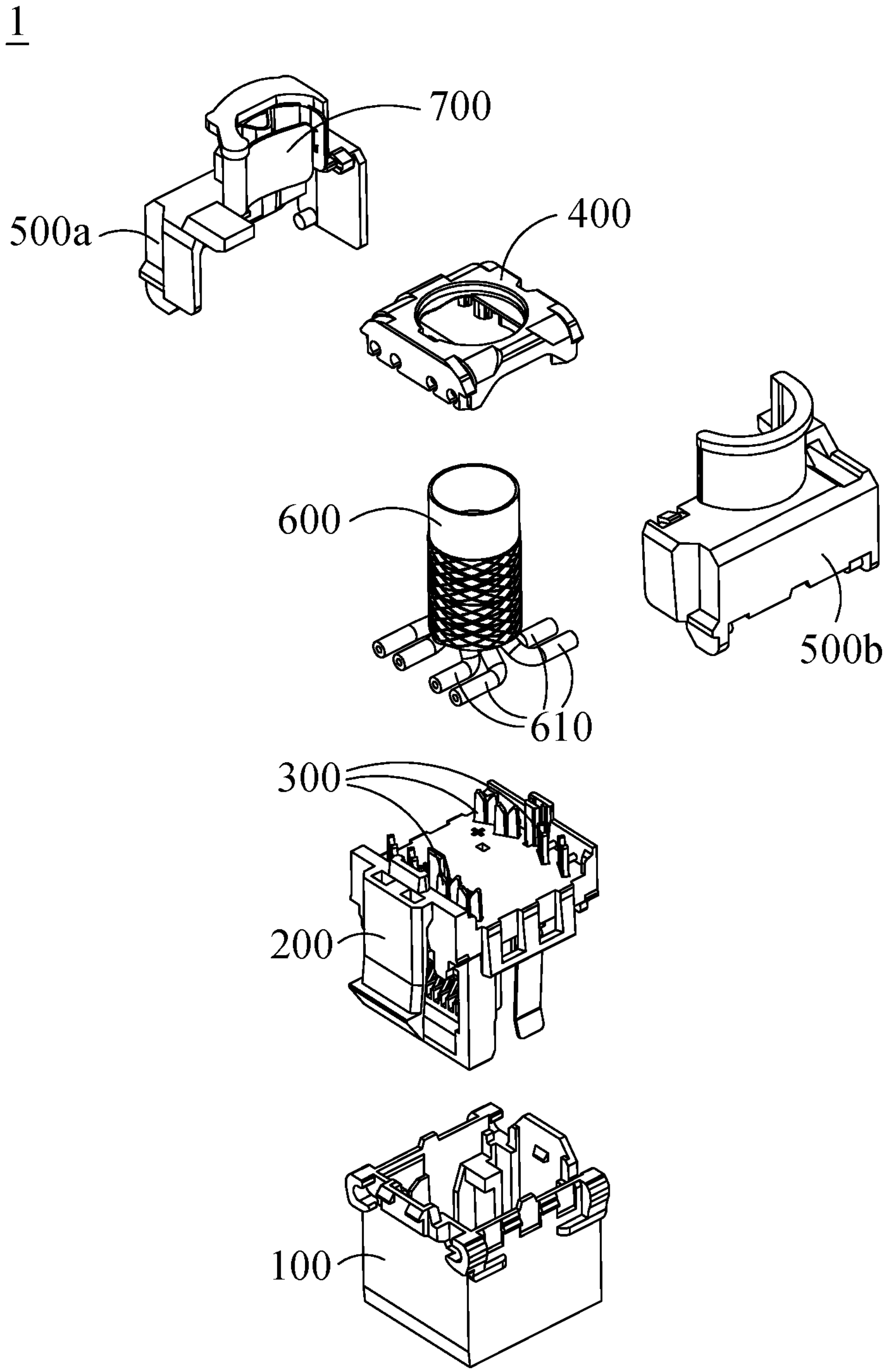
FIG. 3 is an explosive diagram of FIG. 2.

Referring to FIG. 2 and FIG. 3, a keystone jack assembly 1 for installing a cable 600 is illustrated in a perspective diagram according to an embodiment of the present disclosure. As shown in the figures, the keystone jack assembly 1 includes a jack housing 100, a piercing contact housing 200, a plurality of piercing contacts 300, a wire cap 400 and a cover 500. The piercing contact housing 200 is disposed on the jack housing 100. The piercing contacts 300 are mounted on the piercing contact housing 200. The wire cap 400 is movably disposed on the piercing contact housing 200 to envelop the piercing contacts 300, and the cover 500 is pivotally connected to the jack housing 100.

Specifically, the jack housing 100 can define a passage. One end of the passage is configured to allow a patch cord connected to a patch panel to insert therein, and the other end of the passage is configured to accommodate the piercing contact housing 200. The piercing contacts 300 may be insulation-displacement connectors (IDC) or other conductive structures with rigidity. Besides the piercing contacts 300, which are also known as piercing terminals, the keystone jack assembly 1 may further include a printed circuit board (PCB), a contact holder and a plurality of spring contacts. The piercing contacts 300 may be fixedly disposed on the printed circuit board and passes through a base of the piercing contact housing 200. The spring contacts are held by the contact holder and electrically connected to the piercing contacts 300. Since there is no relative displacement between the jack housing 100 and the piercing contact housing 200 after these two components combine with each other, the jack housing 100 and the piercing contact housing 200 can be also regarded as an individual part.

Furthermore, the cable 600 includes a plurality of wires 610 electrically connect to the piercing contacts 300. During the installation, all of the wires 610 are held by the wire cap 400, and the wire cap 400 is pressed toward the piercing contact housing 200 by the cover 500. In this embodiment, the cover 500 includes two covering parts, which are referred to as a first covering part 500*a* and a second covering part 500*b* in the contexts hereinafter. When the wire cap 400 is entirely mounted onto/into the piercing contact housing 200, the wire cap 400 envelopes the piercing contacts 300, and top sides of the piercing contacts 300 or the piercing contact housing 200 would pierce outer insulations of the wire 610 to construct electric connections between cores of the wires 610 and the piercing contacts 300.

Figure 4:
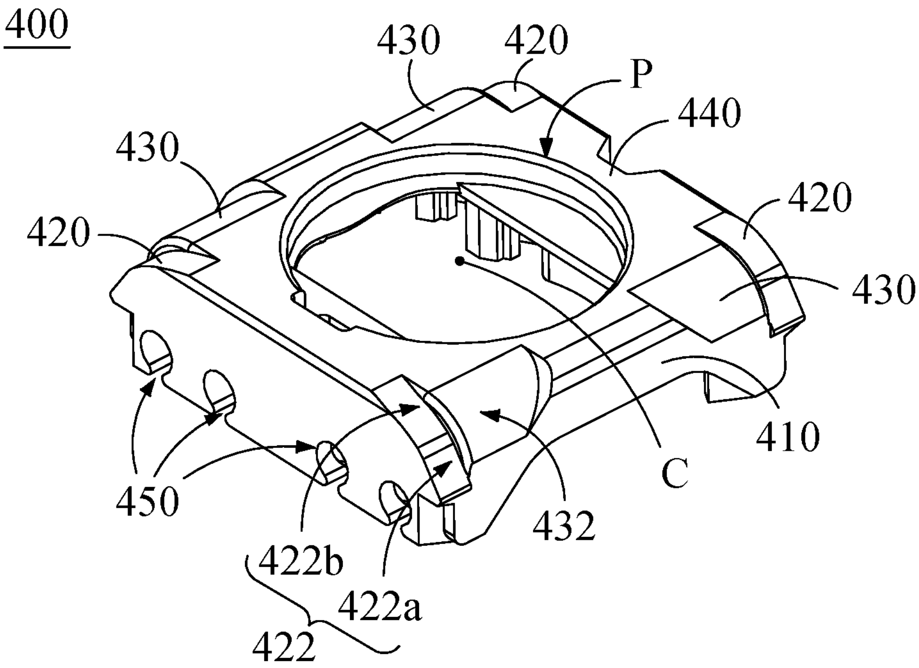
FIG. 4 is a perspective diagram illustrating the wire cap shown in FIG. 3.
Figure 5:
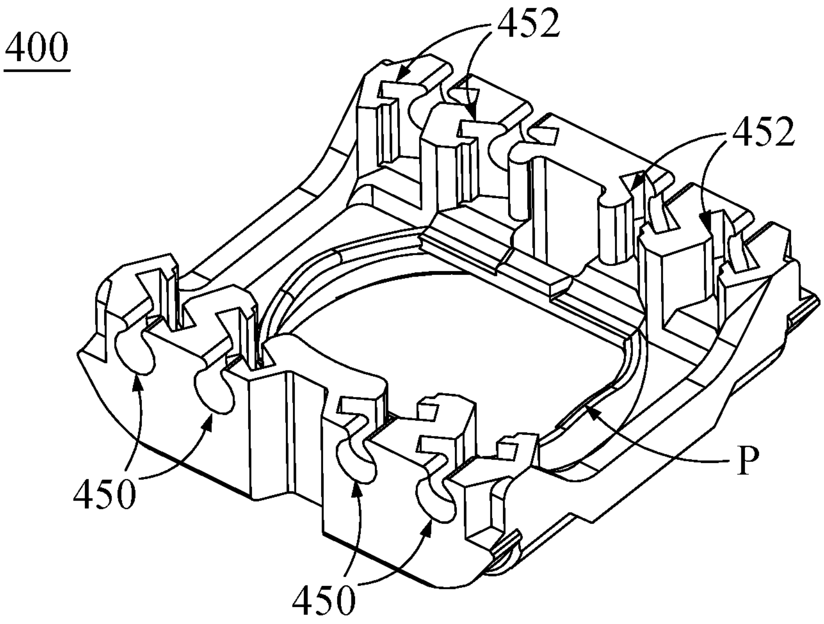
FIG. 5 is a perspective diagram illustrating the wire cap shown in FIG. 3 from another viewpoint.
Figure 6:
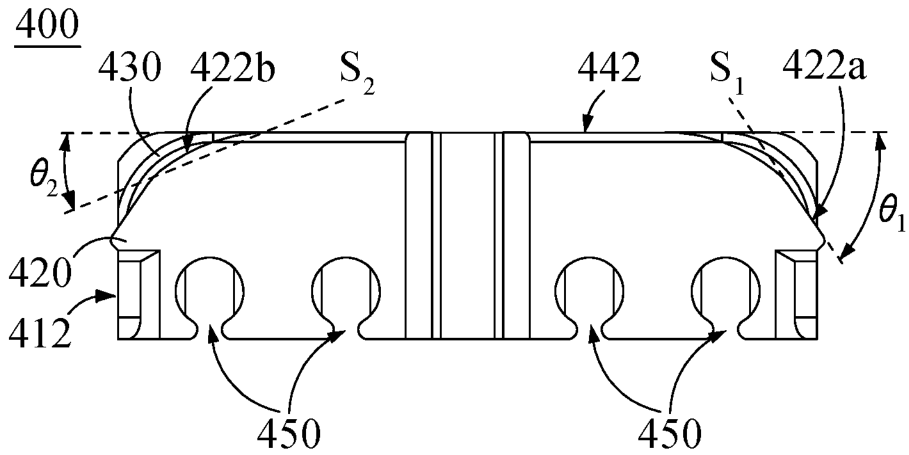
FIG. 6 is a front view of FIG. 4.

Referring to FIG. 4 through FIG. 6, the wire cap 400 includes a wire cap main body 410, at least one first guiding portion 420, at least one second guiding portion 430 and a third guiding portion 440, and the first guiding portion 420 and the second guiding portion 430 are connected to the cap main body 410. In order to accommodate the cable 600, a cable passage P is formed on the cap main body 410, more preferably formed on a central region of the cap main body 410, and the third guiding portion 440 is connected between the first guiding portion 420 and the cable passage P and between the second guiding portion 430 and the cable passage P. In this embodiment, the numbers of the first guiding portions 420 and the second guiding portions 430 are four, respectively. These first guiding portions 420 and second guiding portions 430 are respectively symmetrically disposed at a periphery of the cap main body 410 about the cable passage P at the same intervals, but it is not limited thereto. Preferably, several wire holding portions 450 adapted to holding the wires 610 and several inserting slots 452 are formed at the periphery and the bottom of the wire cap main body 410. The wire holding portions 450 are exemplary to be holes, and the inserting slots 452 communicate with the wire holding portions 450. During installation, top portions of the piercing contacts 300 are inserted into the inserting slots 452 and pierce the wires 610 held by the wire holding portions 450. This configuration makes the piercing contact housing 200, the piercing contacts 300 and the wire cap 400 combine tighter and more compact.

When the wire cap 400 is mounted to the piercing contact housing 200, an upper surface of the wire cap 400 will contact a lower surface of the cover 500. To prevent unbalanced pressing or deflection of the wire cap 400, the contact between the wire cap 400 and the cover 500 is designed to be progressive. That is, the cover 500 will contact with the first guiding portions 420, the second guiding portions 430 and the third guiding portion 440 in order. To achieve the contact condition, as shown in FIG. 6, the cap main body 410 has a cap side surface 412, and each first guiding portion 420 protrudes away from the cap side surface 412. Therefore, when the first covering part **500*a* and the second covering part 500*b* retract from outsides of the wire cap 400, the lower surface of the cover 500 will contact with the first guiding portions 420 in advance compared to other guiding portions. In addition, each first guiding portion 420 has a first guiding upper surface 422 proximal to the cable passage P, each second guiding portion 430 has a second guiding upper surface 432 proximal to the cable passage P, and the second guiding upper surface 432 is equal to or higher than the first guiding upper surface 422. Preferably, the entire second guiding upper surface 432 is higher than the first guiding upper surface 422. Thereby, as the first covering part 500*a* and the second covering part 500*b* continue retracting from the outside to the inside of the wire cap 400, the lower surface of the cover 500 will then contact with the second guiding potions 430, and finally contact with the third guiding portion 440 until the entire wire cap 400 is overlapped by the cover 500**.

Furthermore, as shown in FIG. 6, the third guiding portion 440 has a third guiding upper surface 442, each of the first guiding upper surface 422 includes a first distal surface section **422*a* and a first proximal surface section 422*b*. The first proximal surface section 422*b* is connected between the first distal surface section 422*a* and the third guiding upper surface 442. More importantly, the first distal surface 422*a* defines a first distal plane $S_1$, which passes through an end point of the first distal surface 422*a* and an intersection of the first distal surface 422*a* with the first proximal surface section 422*b*. Similarly, the first proximal surface 422*b* defines a first proximal plane $S_2$, which passes through intersections of the first proximal surface 422*b* with the first distal surface section 422*a* and the third guiding upper surface 442. Thereby, an angle $\theta_1$ formed between first distal plane $S_1$ and the third guiding upper surface 442 is greater than an angle $\theta_2$ formed between the first proximal plane $S_2$ and the third guiding upper surface 442. In other words, the slopes of the first distal plane $S_1$ and the first proximal plane $S_2$ are different. Therefore, as a portion of the lower surface of the cover 500 abuts against and moves along the first distal surface section 422*a*, after another portion of the lower surface of the cover 500 contacts with the second guiding portion 430, the portion contacted with the first distal surface section 422*a* will no longer contact with the first proximal surface section 422*b***, and the progressive contact is thus achieved.

In this embodiment, the first distal surface section **422*a* is a plane, and the first proximal surface section 422*b* is an arc surface. These two surface sections are connected by a fillet surface. However, based on practical requirements, the first distal surface section 422*a* and the first proximal surface section 422*b* can be both planes, both arc surfaces, or combinations thereof. On the other hand, the second guiding upper surface 432 is an arc surface, but a spherical surface or a chamfering surface can also be employed. Moreover, the third guiding portion 440 is planar and enclose the cable passage P. The geometries of the first guiding upper surface 422 and the second guiding upper surface 432 contribute to incremental relative motion between the wire cap 400 and the cover 500**, and the geometry of the third guiding upper surface stabilize the final step of the coupling of the two components.

Figure 7:
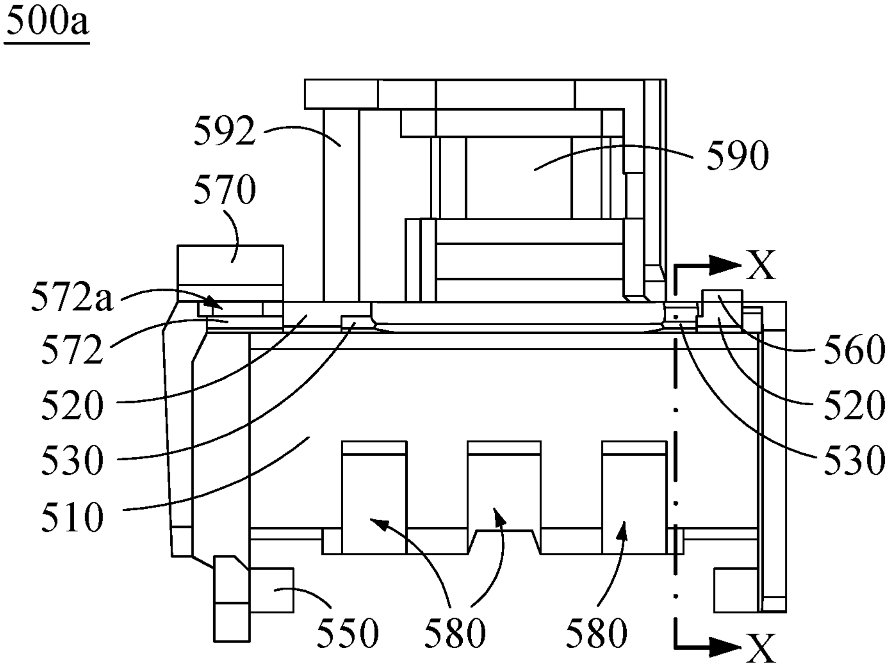
FIG. 7 is a right view illustrating the first covering part shown in FIG. 3.
Figure 8:
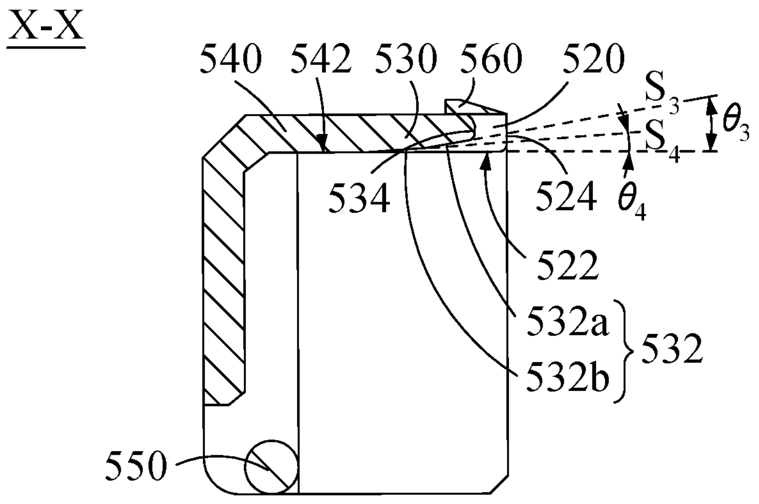
FIG. 8 is a cross-sectional diagram according to the cross-section X-X in FIG. 7.
Figure 9:
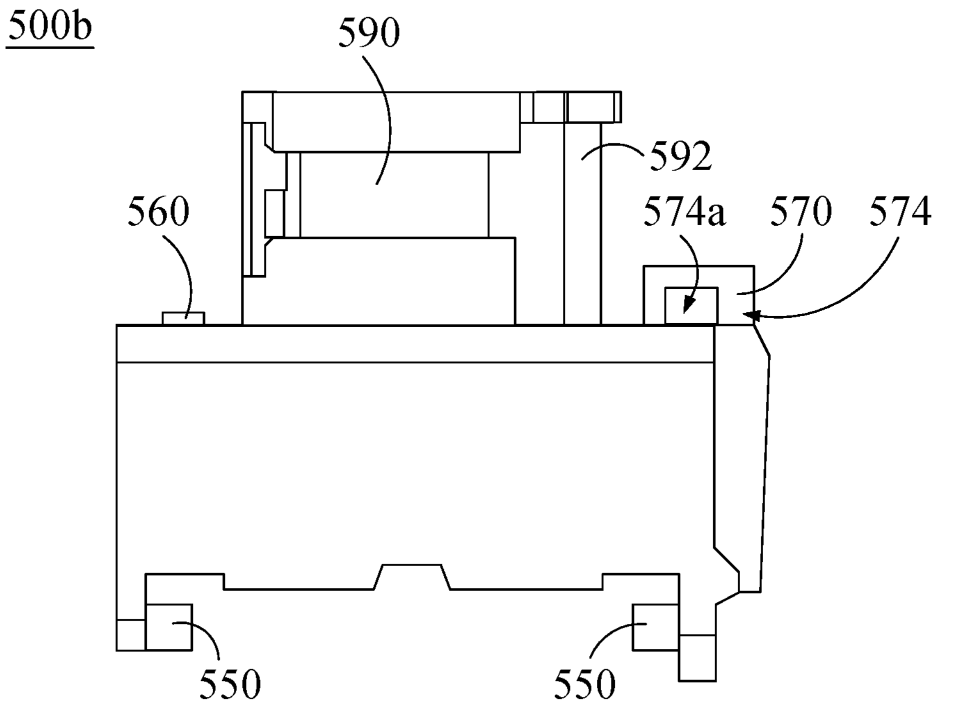
FIG. 9 is a left view illustrating the first covering part shown in FIG. 3.

Referring to FIG. 7 through FIG. 9, the first covering part **500*a* is shown and includes a main body 510, at least one first contact portion 520, at least one second contact portion 530 and a third contact portion 540. In the embodiment, the numbers of the first contact portions 520 and the second contact portions 530 are two, respectively. These first contact portions 520 and second contact portions 530 are connected to the main body 510. The third contact portion 540 is connected to and disposed outside the first contact portions 520 and the second contact portion 530 relative to a center C of the wire cap 400. Since the first covering part 500*a* and the second covering part 500*b* both pivot to the center C, the center C can be also cooperatively defined by the first covering part 500*a* and the second covering part 500*b*. Similarly, for the contact requirement, each first contact portion 520 has a first contact lower surface 522, each second contact portion 530 has a second contact lower surface 532, the third contact portion 540 has a third contact lower surface 542, and the second contact lower surface 532 is equal to or higher than the first contact lower surface 522 relative to the third contact lower surface 540. More preferably, the entire second contact lower surface 532 maintains higher than the first contact lower surface 522 and the third contact lower surface 540**.

Specifically, as shown in FIG. 8, the second contact lower surface 532 includes a second distal surface section **532*a* and a second proximal surface section 532*b*. The second proximal surface section 532*b* is connected between the second distal surface section 532*a* and the third contact lower surface 542. The second distal surface section 532*a*** defines a second distal plane $S_3$, which passes through an end point of the second distal surface section 532*a* and an intersection of the second distal surface section 532*a* with the second proximal surface section 532*b*. The second proximal surface section 532*b* defines a second proximal plane $S_4$, which passes through intersections of the second proximal surface section 532*b* with the second distal surface section 532*a* and the third contact lower surface 542. Thereby, an angle $\theta_3$ formed between the second distal plane $S_3$ and the third contact lower surface 542 is greater than an angle $\theta_4$ formed between the second proximal plane $S_4$ and the third contact lower surface 542. That is, the slopes of the second distal plane $S_3$ and the second proximal plane $S_4$ are different. Therefore, when the first covering part 500*a* contacts with the wire cap 400, the first contact lower surface 522 will contact with the first guiding upper surface 422, more specifically the first distal surface section 422*a* first. Since the second distal plane $S_3$ and the second proximal plane $S_4$ have different slopes, the second distal surface section 532*a* will not contact with the second guiding portion 430 at the same time. After the first contact portion 520 moves along the first guiding portion 420 to a specific position, the second proximal surface section 532*b* will take over the contact role and abut against the second guiding portion 430 until the third contact portion 540 contacts with the third guiding portion 440. Similarly, the second distal surface section 532*a* and the second proximal surface section 532*b* may be both planes, but are not limited thereto. This configuration benefits manufacturing process of the two covering parts.

In fact, there are more than one way to make the first contact portion 520 as the first contact part of the first covering part 500*a*. For example, the first contact portion 520 may have a first contact side surface 524, the second contact portion 530 may have a second contact side surface 534, and the first contact side surface 524 protrudes relative to the second contact side surface 534. However, referring to FIG. 11, the first contact side surface 524 can also be coplanar with the second contact side surface 534, which is based on practical requirements.

Moreover, for the ease of manufacturing, the first contact lower surface 522 is coplanar with the third contact lower surface 542. That is, there is no actual physical boundary between the first contact portion 520 and the third contact portion 540. This arrangement makes the two covering parts have simplified geometries.

Figure 10:
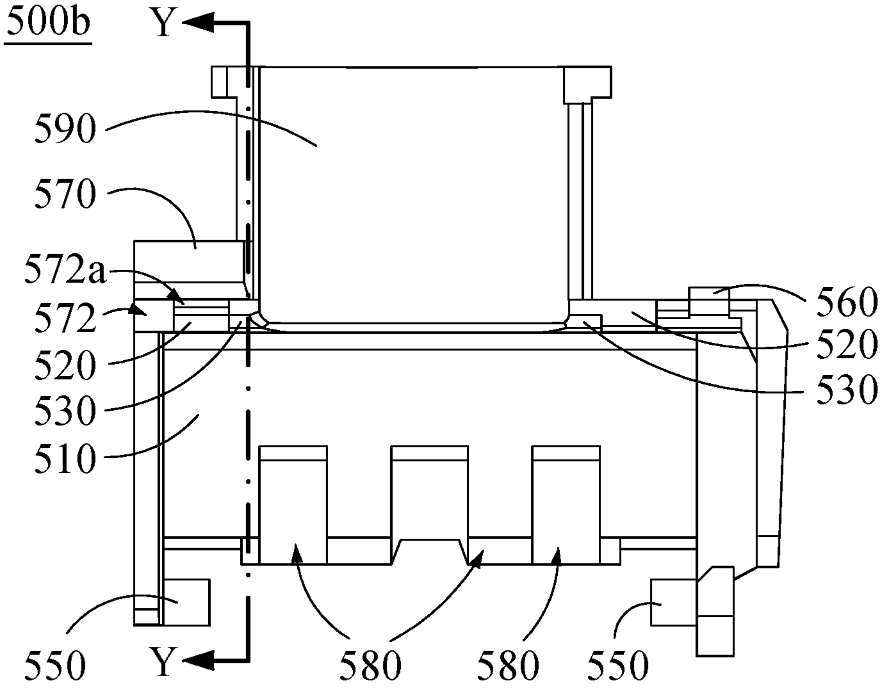
FIG. 10 is a left view illustrating the second covering part shown in FIG. 3.
Figure 11:
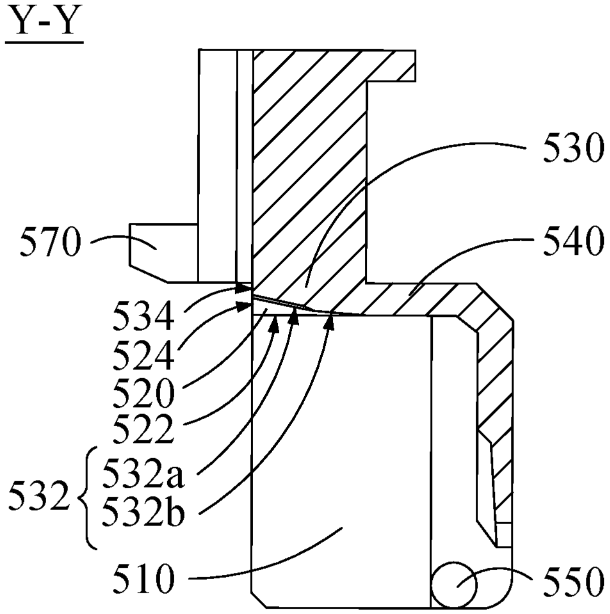
FIG. 11 is a cross-sectional diagram according to the cross-section Y-Y in FIG. 10.

Besides, also referring to FIG. 10 and FIG. 11, the first covering part 500*a* and the second covering part 500*b* each include a pivoting portion 550 protrudes toward an inner side of the corresponding main body 510. The first covering part 500*a* and the second covering part 500*b* are pivotally connected to the jack housing 100 through the corresponding pivoting portion 550. Specifically, the jack housing 100 includes hook-shaped holders 110 disposed on two opposite sides thereof, and the pivoting portions 550, such as pivoting bumps or shafts in this embodiment, are engaged with the holders 110. Therefore, the first covering part 500*a* and the second covering part 500*b* are capable of pivoting relative to the jack housing 100 via the pivoting portions 550. It is noted that since the jack housing 100 and the piercing contact housing 200 can be regarded as an individual part, the first covering part 500*a* and the second covering part 500*b* can be also pivotally connected to the piercing contact housing 200 in other embodiments. During installation operation, a user can use fingers to press the first covering part 500*a* and the second covering part 500*b* to force these two covering parts pivot toward each other, and the wire cap 400 is thus pressed and slides toward the piercing contact housing 200.

Referring to FIG. 7 and FIG. 10 again, several positioning grooves 580 are preferably formed on inner side surfaces of the first covering part 500*a* and the second covering part 500*b*. Correspondingly, the piercing contact housing 200 includes several flanges. During installation, the flanges can be accommodated in the positioning grooves 580 to make sure there is no positional deviation between the piercing contact housing 200 and the cover 500. In addition, the first covering part 500*a* and the second covering part 500*b* each include a cable holder 590. When the two covering parts pivot to combine to an integral component, the cable 600 is enclosed by the cable holders 590. Preferably, the cable holder 590 of the first covering part 500*a* includes a grounding member holder 592, and the keystone jack assembly 1 further includes a grounding member 700, which is shown in FIG. 3. The grounding member 700 is sleeved on the grounding member holder 592 and contacts with the screened part on the outer surface of the cable 600 for grounding.

Furthermore, in order to lock the first covering part 500*a* and the second covering part 500*b* after combination, the first covering part 500*a* and the second covering part 500*b* may each include a latching portion 560 and a locking portion 570. The latching portion 560 can be regarded as a tenon, and a mortise 572*a* is formed on the locking portion 570. After the first covering part 500*a* and the second covering part 500*b* pivot to merge together, the two covering parts interlock with each other through engagement between each of the latching portion 560 and the corresponding mortise 572*a*. More specifically, the locking portion 570 has a locking lower surface 572 and a locking side surface 574, the mortise 572*a* is formed on the lower surface 572, and an operating hole 574*a* is formed on the locking side surface 574 and communicates with the mortise 572*a*. Preferably, the locking side surface 574 is on the opposite side relative to the locking lower surface 572. Thereby, when the user wants to release the interlocking relationship between the two covering parts, he or she can put a finger into the operating hole 574*a* to push the latching portion 560 out of the mortise 572*a*. In addition, as shown in FIG. 7 and FIG. 10, the latching portions 560 and the locking portions 570 can be geometrical extensions of the first contact portions 520 or the second contact portions 530. Specifically, the position of the mortise 572*a* formed on the first covering part 500*a* is corresponding to the position of the latching portion 560 formed on the second covering part 500*b*, and vice versa. Therefore, there would be a little variation between the relative positions or sizes of the latching portions 560 and the mortises 572*a* formed on the corresponding covering parts, but it does not affect the interlocking function.

Figure 12:
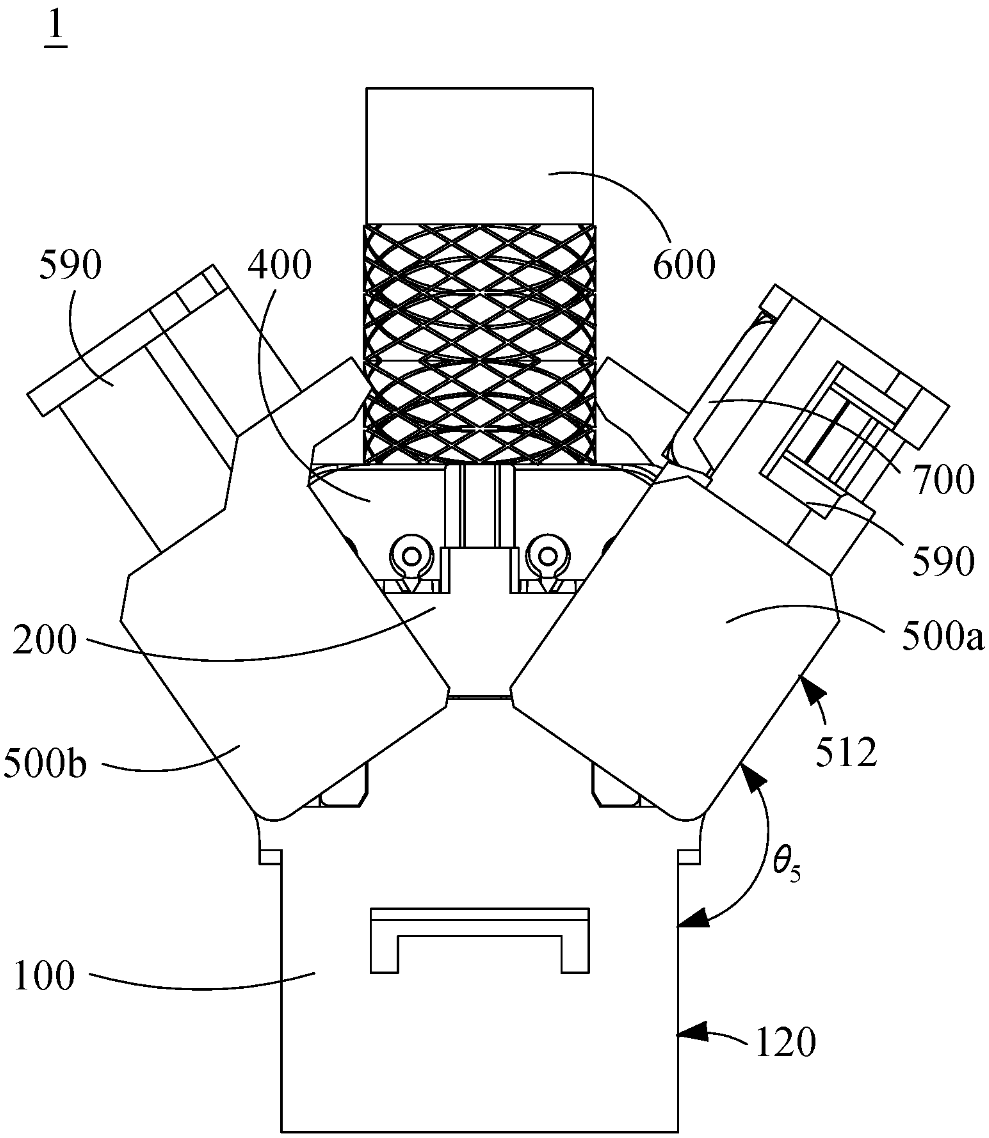
FIG. 12 is a front view illustrating the keystone jack assembly according to the embodiment shown in FIG. 2 when the two covering parts pivot to a first position.
Figure 13:
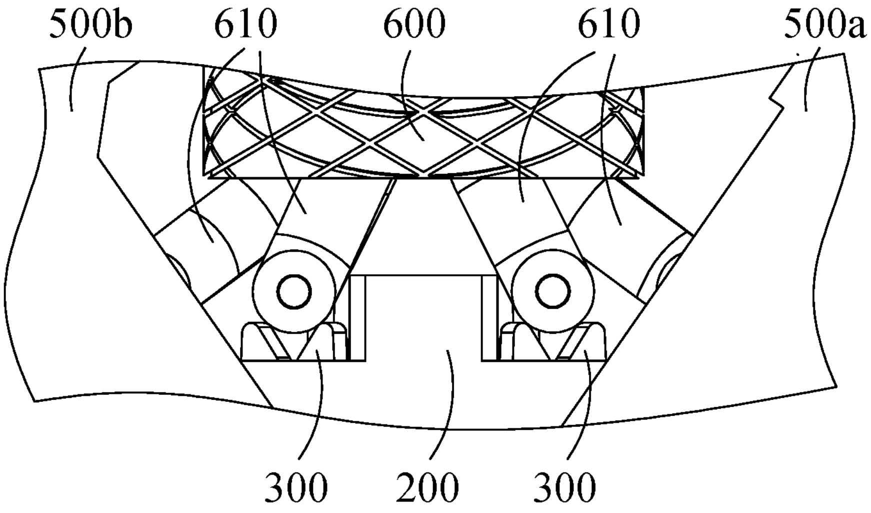
FIG. 13 is an enlarged diagram of partial components shown in FIG. 12.
Figure 14:
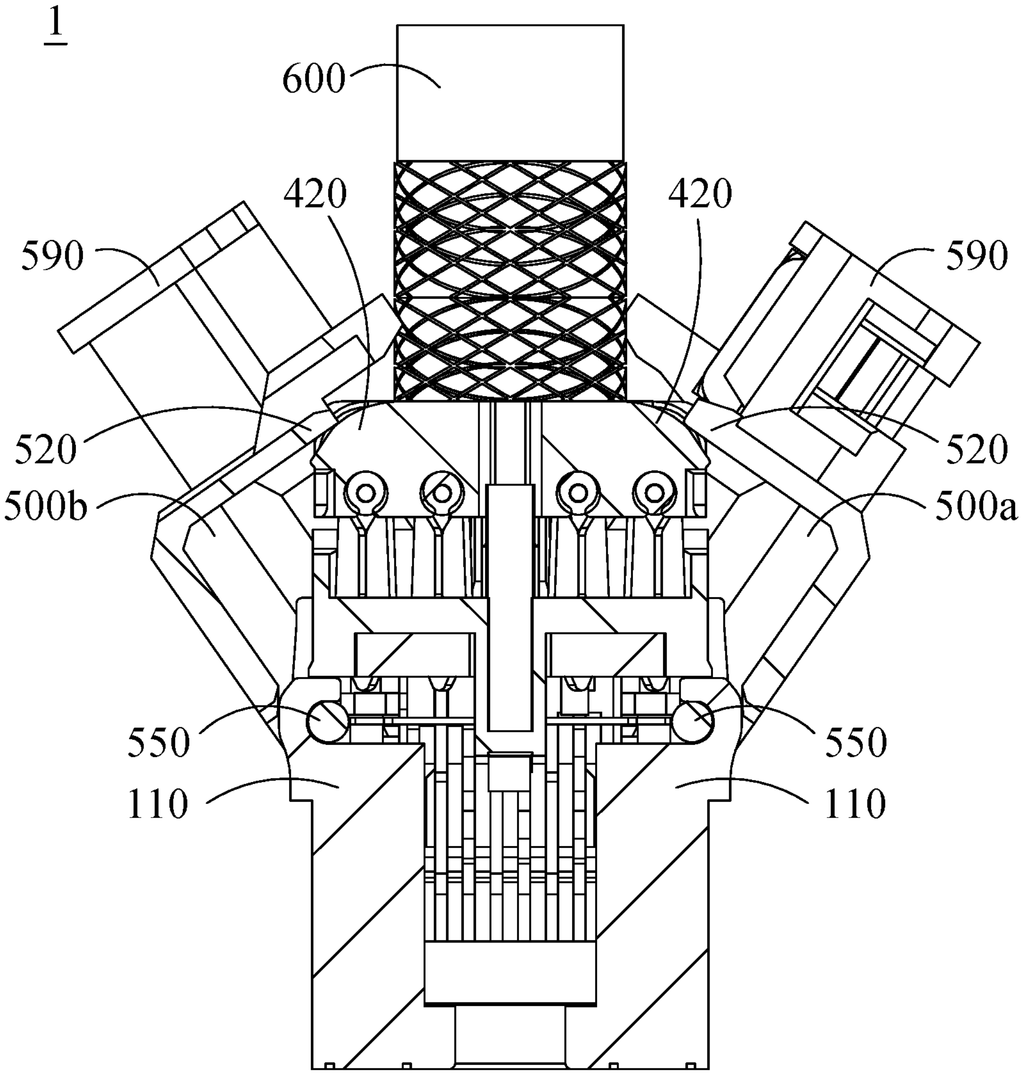
FIG. 14 is a cross-sectional diagram of FIG. 12.
Figure 15:
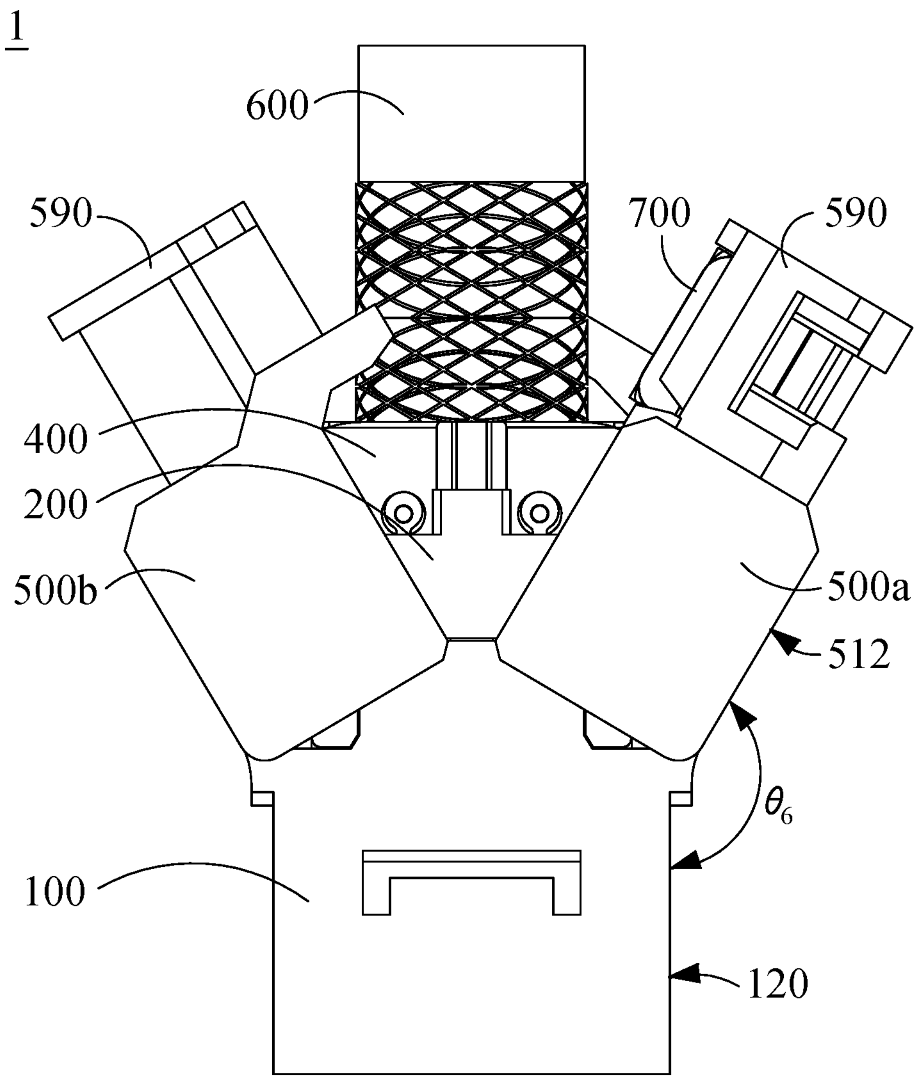
FIG. 15 is a front view illustrating the keystone jack assembly according to the embodiment shown in FIG. 2 when the two covering parts pivot to a second position.

Referring to FIG. 12 through FIG. 19, the detail of how the wire cap 400 and the cover 500 cooperate will be clearly illustrated. Firstly, after mounting the piercing contact housing 200 onto the jack housing 100, the user may put the wire cap 400 on the piercing contact housing 200. When the wires 610 barely abut against top sides of the piercing contacts 300 or the piercing contact housing 200, as shown in FIG. 13, this situation is called as "pre-seat". In the meanwhile, each of the first guiding portions 420 is located in a retracting path of an end of each of the first contact portions 520. As shown in FIG. 12 and FIG. 14, the first covering part 500*a* (or the second covering part 500*b*) has a covering side surface 512, and the jack housing 100 has a housing sider surface 120. While the first contact portions 520 of the two covering parts start to contact with the first guiding portions 420, an angle $\theta_5$ formed between the covering side surface 512 and the housing sider surface 120 is about 145 degrees. Also, a distance between the lower surface of the wire cap 400 and the upper surface of the piercing contact housing 200 is about 2.95 mm. Since the two covering parts are point symmetric about the center C of the wire cap 400, the press loading is evenly exerted on the upper surface of the wire cap 400, and thus an unbalanced displacement is avoided.

Figure 16:
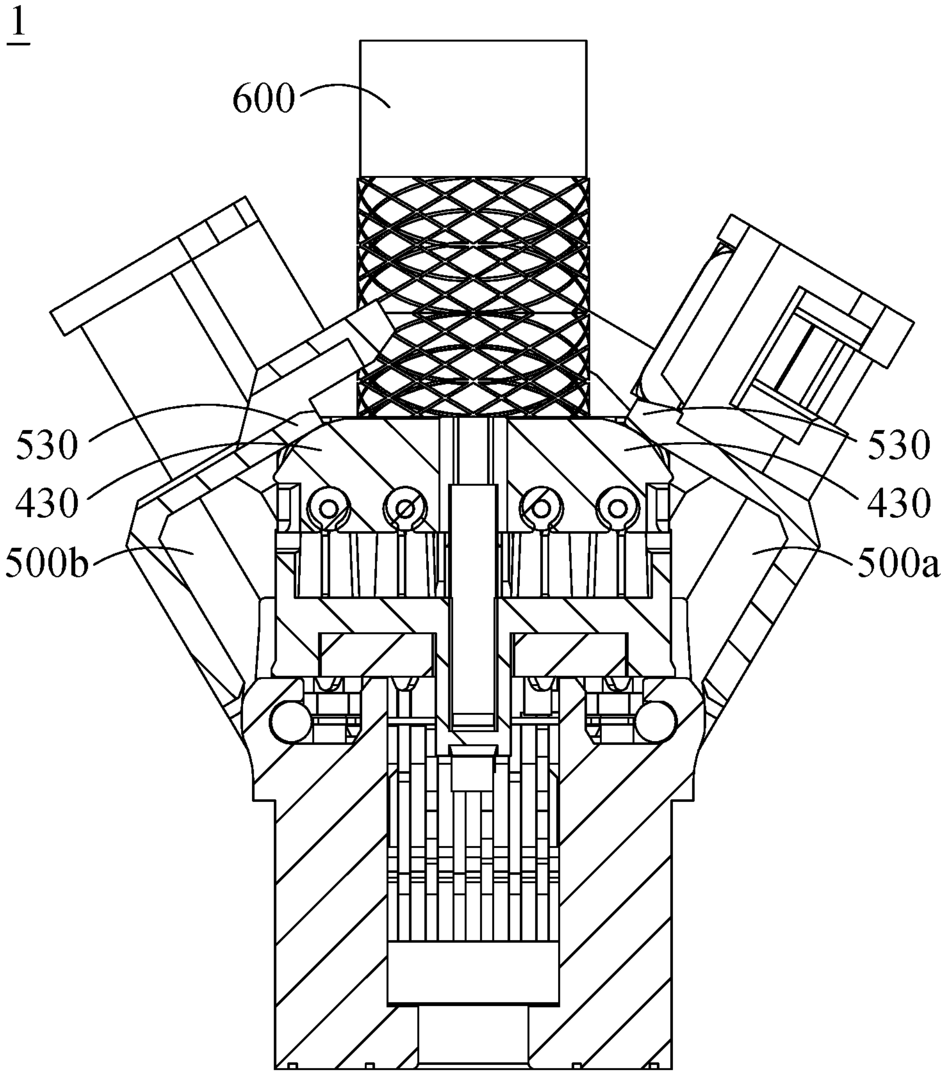
FIG. 16 is a cross-sectional diagram of FIG. 15.
Figure 17:
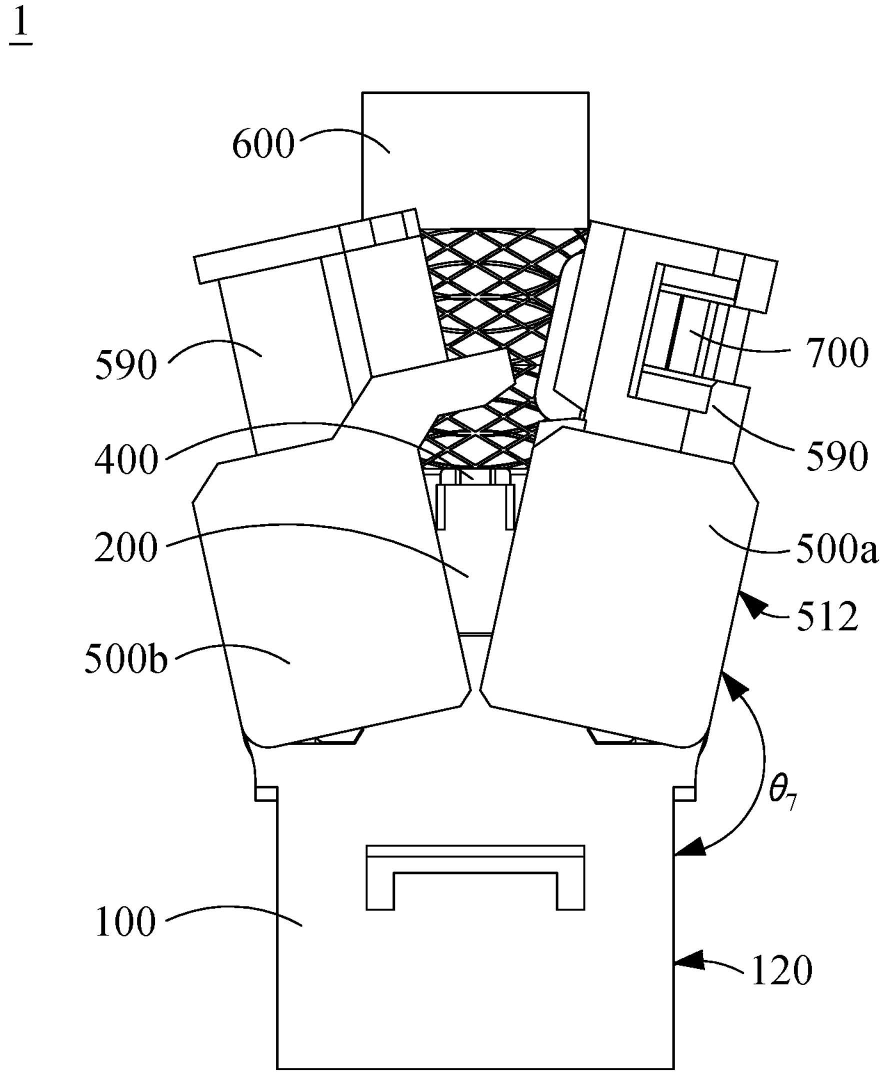
FIG. 17 is a front view illustrating the keystone jack assembly according to the embodiment shown in FIG. 2 when the two covering parts pivot to a third position.

Then, the first covering part 500*a* and the second covering part 500*b* continue pivoting toward each other, forcing the wire cap 400 to further move toward the piercing contact housing 200 incrementally. The first contact portions 520 keep contacting with the first guiding portions 420 until the angle $\theta_5$ changes to $\theta_6$, which is about 149 degrees. Also, the distance between the lower surface of the wire cap 400 and the upper surface of the piercing contact housing 200 reduces to about 2.40 mm, and the second contact portions 530 start to abut against the second guiding portions 430, as shown in FIG. 16.

Figure 18:
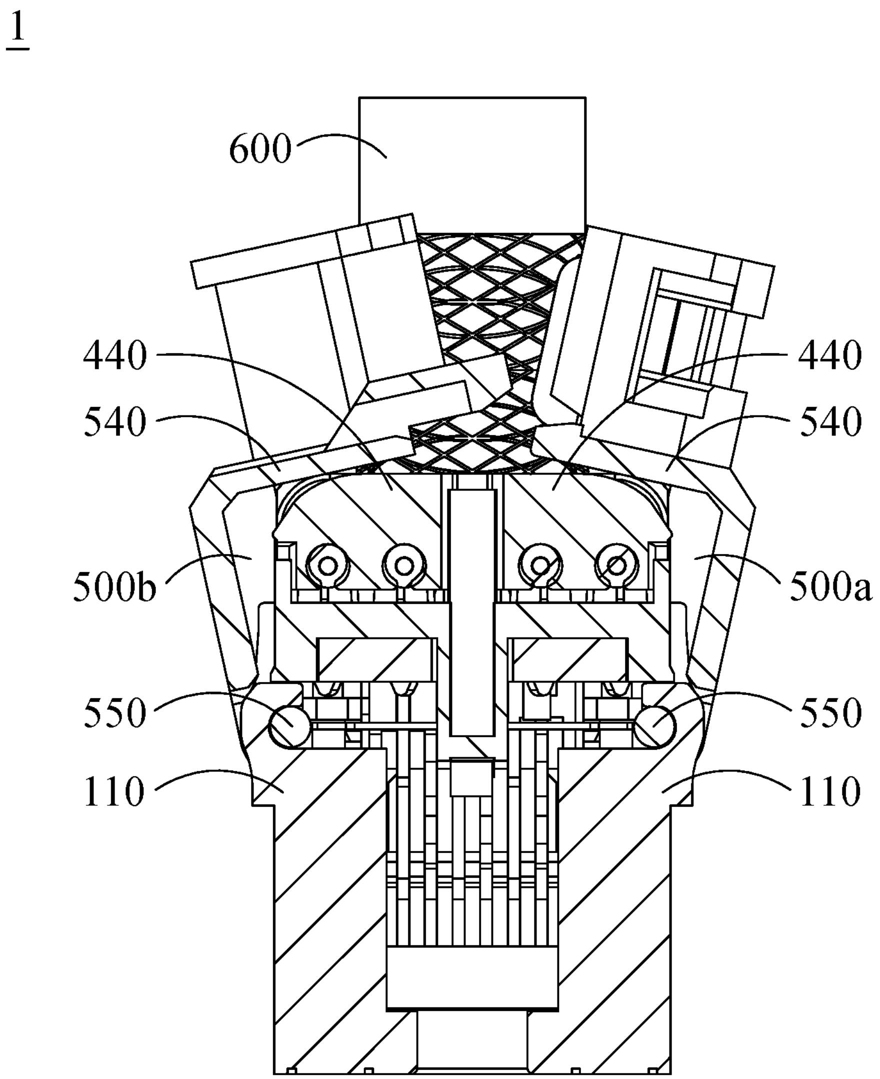
FIG. 18 is a cross-sectional diagram of FIG. 17.
Figure 19:
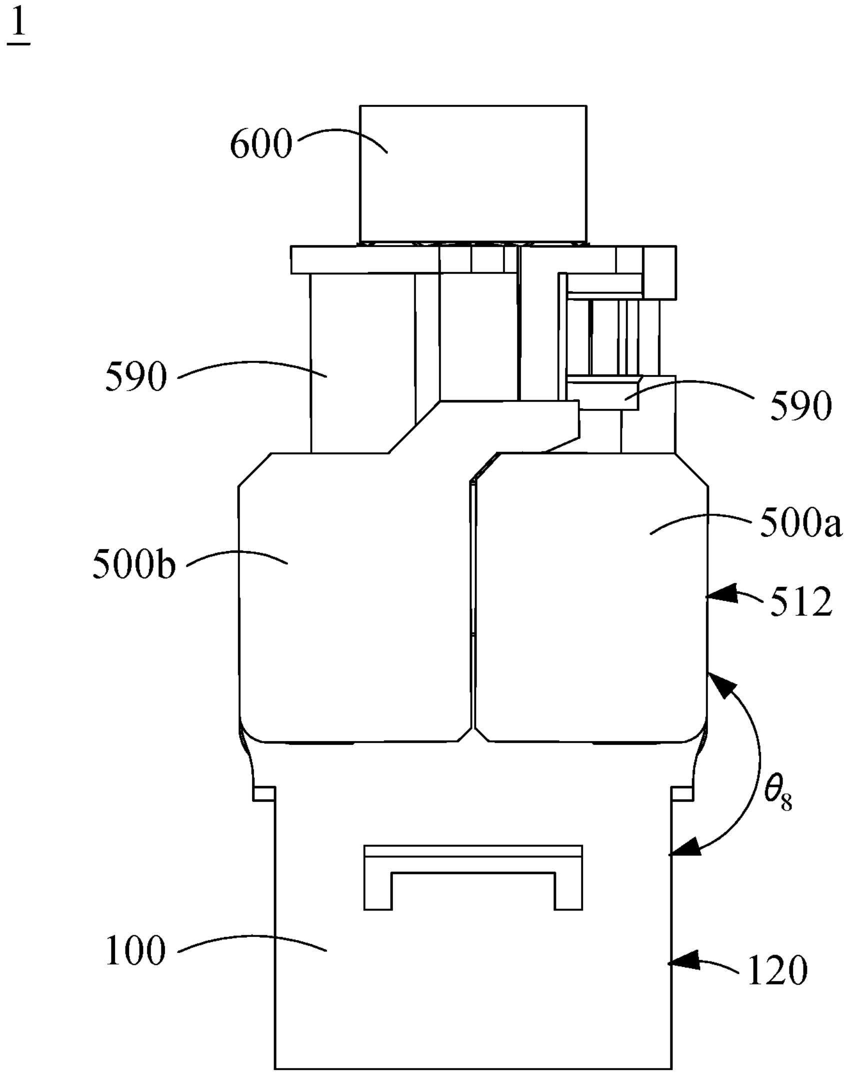
FIG. 19 is a front view illustrating the keystone jack assembly according to the embodiment shown in FIG. 2 when the two covering parts pivot to a fourth position.

As described above, because of the geometric design of the first guiding portions 420 and the second contact portions 530, i.e., the first distal surface section 422*a*, the first proximal surface section 422*b*, the second distal surface section 532*a* and the second proximal surface section 532*b*, while the second contact portions 530 contact with the second guiding portions 430, the first contact portions 520 are separated from the first guiding portions 420. That is, the first contact portions 520 and the first guiding portions 420 no longer contact with each other. Then, the first covering part 500*a* and the second covering part 500*b* continue pivoting toward each other, forcing the wire cap to move toward the piercing contact housing 200. Until the angle $\theta_6$ changes to $\theta_7$, which is about 168 degrees, the distance between the lower surface of the wire cap 400 and the upper surface of the piercing contact housing 200 reduces to about 0.48 mm. Also, the third contact portion 540 starts to contact with the third guiding portion 440, as shown in FIG. 18.

Finally, the first covering part 500*a* and the second covering part 500*b* pivot to combine as a single part, pressing the wire cap 400 to be mounted on the piercing contact housing 200 completely. So, the distance between the lower surface of the wire cap 400 and the upper surface of the piercing contact housing 200 reduces to zero, and the angle $\theta_7$ changes to $\theta_8$, which is about 180 degrees. In the meanwhile, the latching portions 560 of the first covering part 500*a* and the second covering part 500*b* engage with the mortises 572*a* of the locking portions 570 of the second covering part 500*b* and the first covering part 500*a*, which makes the two covering parts interlock with each other. In summary, the first contact portions 520 abut against the first guiding portions 420, the second contact portions 530 abut against the second guiding portions 430 and the third contact portion 540 abuts against the third guiding portion 440 in order as the two covering parts pivots toward each other. This progressive contact prevents unbalanced movement of the wire cap 400, and overcomes resistant force about 80-100 kgf applied by the wires 610. Therefore, users or technicians do not need to use work saving tools to press the wire cap 400, and the convenience is thus increased.

Moreover, due to the work-saving design, the size of the keystone jack assembly 1 can keep slim, compact and short. That means the width of the cover 500 is within 17.30 mm, the width of the jack housing 100 is within 22.10 mm, and the entire length from a top end of the cover 500 to a bottom end of the jack housing 100 is within 27.00 mm. These specifications enable the keystone jack assembly 1 to have wider usage. In addition, the die-cast covering parts 500*a* and 500*b* are close-knit fixed by collaborative plastic parts, so a gastight shield can be achieved without breaking any holes as leakage that reduces electromagnetic interference (EMI) immunity.

While the present disclosure has been described by means of specific embodiments, numerous modifications and variations could be made thereto by those skilled in the art without departing from the scope and spirit of the present disclosure set forth in the claims.

What is claimed is:

1. A keystone jack assembly, comprising:
- a jack housing;
- a piercing contact housing disposed on the jack housing;
- a plurality of piercing contacts mounted on the piercing contact housing;
- a wire cap movably disposed on the piercing contact housing to envelop the plurality of piercing contacts, comprising:
  - a cap main body with a cable passage;
  - at least one first guiding portion connected to the cap main body;
  - at least one second guiding portion connected to the cap main body; and
  - a third guiding portion connected between the at least one first guiding portion and the cable passage and between the at least one second guiding portion and the cable passage; and
- a cover pivotally connected to the jack housing or the piercing contact housing, comprising:
  - two covering parts, each covering part comprising:
    - a main body;
    - at least one first contact portion connected to the corresponding main body;
    - at least one second contact portion connected to the corresponding main body; and
    - a third contact portion connected to and disposed outside the at least one first contact portion and the at least one second contact portion relative to a center cooperatively defined by the two covering parts;
- wherein the at least one first contact portion abuts against the at least one first guiding portion, the at least one second contact portion abuts against the at least one second guiding portion and the third contact portion abuts against the third guiding portion in order as the two covering parts pivots toward each other.

2. The keystone jack assembly according to claim 1, wherein the cap main body has a cap main body side surface, the at least one first guiding portion protrudes away from the cap main body side surface and has a first guiding upper surface proximal to the cable passage, the at least one second guiding portion has a second guiding upper surface proximal to the cable passage, and the second guiding upper surface is equal to or higher than the first guiding upper surface.

3. The keystone jack assembly according to claim 2, wherein the third guiding portion has a third guiding upper surface, the first guiding upper surface comprises a first distal surface section and a first proximal surface section, the first proximal surface section is connected between the first distal surface section and the third guiding upper surface, the first distal surface section defines a first distal plane, the first proximal surface section defines a first proximal plane, and an angle formed between the first distal plane and the third guiding upper surface is greater than an angle formed between the first proximal plane and the third guiding upper surface.

4. The keystone jack assembly according to claim 3, wherein the first distal surface section and the first proximal surface section are planes, arc surfaces or combinations thereof.

5. The keystone jack assembly according to claim 2, wherein the second guiding upper surface is an arc surface, a spherical surface or a chamfering surface.

6. The keystone jack assembly according to claim 1, wherein the third guiding portion is planar and encloses the cable passage.

7. The keystone jack assembly according to claim 1, wherein the at least one first guiding portion and the at least one second guiding portion are both plural, and the first guiding portions and the second guiding portions are respectively symmetrically disposed at a periphery of the cap main body about the cable passage at the same intervals.

8. The keystone jack assembly according to claim 1, wherein the at least one first contact portion has a first contact lower surface, the at least one second contact portion has a second contact lower surface, and the second contact lower surface is equal to or higher than the first contact lower surface.

9. The keystone jack assembly according to claim 8, wherein the third contact portion has a third contact lower surface, the second contact lower surface comprises a second distal surface section and a second proximal surface section, the second proximal surface section is connected between the second distal surface section and the third contact lower surface, the second distal surface section defines a second distal plane, the second proximal surface section defines a second proximal plane, and an angle formed between the second distal plane and the third contact lower surface is greater than an angle formed between the second proximal plane and the third contact lower surface.

10. The keystone jack assembly according to claim 9, wherein the second distal surface section and the second proximal surface section are both planes.

11. The keystone jack assembly according to claim 8, wherein the third contact portion has a third contact lower surface, and the first contact lower surface is coplanar with the third contact lower surface.

12. The keystone jack assembly according to claim 1, wherein each covering part further comprises a latching portion and a locking portion, a mortise is formed on the locking portion, and the two covering parts interlock with each other through engagement between each of the latching portion and the corresponding mortise.

13. The keystone jack assembly according to claim 12, wherein the locking portion has a locking lower surface and a locking side surface, the mortise is formed on the locking lower surface, and an operating hole is formed on the locking side surface and communicates with the mortise.

14. The keystone jack assembly according to claim 1, wherein each covering part further comprises a pivoting portion protrudes toward an inner side of the corresponding main body, the two pivoting portions are engaged with the jack housing or the piercing contact housing, and the two covering parts are pivotally disposed at two opposite sides of the wire cap.

15. The keystone jack assembly according to claim 1, wherein the at least one first contact portion has a first contact side surface, the at least one second contact portion has a second contact side surface, and the first contact side surface is coplanar with or protrudes relative to the second contact side surface.

16. The keystone jack assembly according to claim 1, wherein the two covering parts are point symmetric about the center.

17. The keystone jack assembly according to claim 1, wherein a cable is accommodated in the cable passage and comprises a plurality of wires passing through the cap main body, the at least one first guiding portion is located in a retracting path of an end of the at least one first contact portion when the plurality of wires barely abut against top sides of the plurality of piercing contacts or the piercing contact housing.

18. The keystone jack assembly according to claim 1, wherein each covering part has a covering side surface, the jack housing has a housing side surface, and an angle formed between the covering side surface and the housing side surface is from 145 to 149 degrees while the at least one first contact portion contacts with the at least one first guiding portion.

19. The keystone jack assembly according to claim 18, wherein the angle is from 149 to 168 degrees while the at least one second contact portion contacts with the at least one second guiding portion, and the at least one first contact portion is separated from the at least one first guiding portion.

20. The keystone jack assembly according to claim 18, wherein the angle is from 168 to 180 degrees while the third contact portion contacts with the third guiding portion.

* * * * *